United States Patent [19]
Keller et al.

[11] Patent Number: 4,676,960
[45] Date of Patent: Jun. 30, 1987

[54] PROCESS FOR CONCENTRATING WASTE PRODUCTS ARISING DURING THE MANUFACTURE OF CARBON ELECTRODES

[75] Inventors: Felix Keller, ED Brielle; Ary A. Kooijman, RL Rozenburg; Robert Engelsman, VJ Ostvorne, all of Netherlands; Werner K. Fischer, Venthone, Switzerland

[73] Assignee: Swiss Aluminium Ltd., Chippis, Switzerland

[21] Appl. No.: 820,012

[22] Filed: Jan. 21, 1986

[30] Foreign Application Priority Data

Jan. 25, 1985 [CH] Switzerland .................... 343/85

[51] Int. Cl.$^4$ .................... C01B 7/00; B01J 8/00; C09C 1/56
[52] U.S. Cl. .................... 423/240; 423/244; 423/245; 423/460
[58] Field of Search .......... 423/242 A, 242 R, 244 A, 423/244 R, 460, 461, 240 S, 245 S

[56] References Cited

U.S. PATENT DOCUMENTS 3,544,263 12/1970 Ninomiya et al. .................. 423/244
4,372,927 2/1983 McCullough ...................... 423/244
4,427,642 1/1984 Arashi et al. ...................... 423/244

Primary Examiner—Gregory A. Heller
Attorney, Agent, or Firm—Bachman & LaPointe

[57] ABSTRACT

The solid, liquid and gaseous waste products which arise during the manufature of carbon electrodes are concentrated.

First, the solid electrode waste is mixed with the carbon-rich dusts from crushing operations, and with lime or lime and gypsum (from a wet scrubbing operation). By means of grinding and screening the mixture is converted to a suitable range of fine particulate sizes, then fed continuously as adsorbent material through a dry scrubbing unit through which is passed the gaseous waste that also contains fractions of fluid waste. The thus charged adsorbent is combusted together with oily waste in a low temperature fluidized bed boiler. The resultant ash and slag which contain the pollutants as non-hazardous calcium sulfate or calcium fluoride are transported to a dumping site. The adsorbent for dry scrubbing units for purifying waste gases from units manufacturing carbon electrodes comprises fine-grained, ground electrode residue, carbon-rich dusts from crushing operations and lime or lime and gypsum.

8 Claims, No Drawings

PROCESS FOR CONCENTRATING WASTE PRODUCTS ARISING DURING THE MANUFACTURE OF CARBON ELECTRODES

BACKGROUND OF THE INVENTION

The invention relates to a process for concentrating solid, liquid and gaseous waste products which arise during the manufacture of carbon electrodes, and relates also to an adsorbent for dry scrubbing equipment for cleaning fumes released from equipment for manufacturing carbon electrodes.

Carbon electrodes manufactured on an industrial scale, in particular anodes for producing aluminum by the fused salt electrolytic process, are made from petroleum coke, anode butts and pitch. After drying, grinding, sieving and mixing, these materials are shaped into blocks of, for example, 400–1200 kg, then baked in a firing process at about 1100° C. to give the final electrode.

At various stages of manufacture of carbon electrodes waste products in solid, liquid and/or gaseous form are produced. Taking the example of anodes for the aluminum industry the following examples can be given:

(a) Waste from the cleaning of the anode butts: coarse and fine particulate carbon, mixed with alumina, cryolite, iron and silicon.

(b) Dusts created during crushing operations: fine particulate petroleum coke with varying fractions of alumina, silicon, iron and other impurities, to some extent including considerable amounts of sulphur.

(c) Tar and oily substances.

(d) Gaseous emissions: non-condensed hydrocarbons, fluorides and sulphur dioxide.

Up to now these waste products have usually been recirculated, burnt off and/or released to the air.

For recirculation purposes use is made in particular of electrostatic filters which effect the precipitation of tar and oily substances out of the waste gases emerging from the electrode baking furnaces. Dust is also removed from the air stream by means of suitable mesh filters and returned to the process. The materials extracted in the recirculation process can however have a negative effect on the quality and constancy of the product. Disposal by combustion of waste products by third parties, dumping or direct emission can lead to high costs as ever stricter regulations have to be satisfied.

A dry scrubbing unit using aluminum oxide as adsorbent has been proposed for the removal of fluorine, fluoride and tarry residuals. Using such an adsorbent it is possible, as is known from aluminum smelter operations, to remove fluorine and tarry components; it is not possible, however, to remove sulphur and sulphur-containing components.

These are two particular disadvantages associated with the use of aluminum oxide as an adsorbent for scrubbing the fumes released from plants manufacturing carbon electrodes:

Not all of the waste products are absorbed that are released during anode production and pollute the atmosphere.

Because of the large amounts of aluminum oxide required, an aluminum smelter must be situated close by. Even if this is the case, the alumina which is contaminated with tar residuals presents a significant disadvantage in subsequent operations.

SUMMARY OF THE INVENTION

The object of the present invention is therefore to develop a process for concentrating solid, liquid and gaseous waste products that arise during the production of carbon electrodes, which functions economically and without disadvantage to the quality and constancy of the product. A further objective is to identify an adsorbent for dry scrubbing units used to clean waste fumes from plants producing carbon electrodes, and namely such an adsorbent which removes all contaminants produced by a plant for manufacturing carbon electrodes.

With respect to the process this object is achieved by way of the invention, in that (a) the solid electrode waste is mixed with the carbon-rich dusts from the crushing operations and lime or lime and gypsum (from a wet scrubbing stage), converted to a suitable range of fine particulate sizes by grinding and screening, and fed continuously as adsorbent through a dry scrubbing unit, (b) the gaseous waste, which also contains liquid fractions, passed through the adsorbent of this dry scrubbing unit, (c) the thus charged adsorbent combusted together with oily waste in a low temperature fluidised bed boiler, and (d) the ash of slag transported to a dumping site.

DETAILED DESCRIPTION

The solid electrode waste can be ground before it is mixed with the carbon-rich dusts from the crushing operations and the lime or lime gypsum, without any change being made in the subsequent course of the process according to the invention.

In the presence of free or combined moisture (lime solution, slaked lime) $SO_2$ can react with lime to form gypsum.

The load on the dry scrubbing unit can be reduced significantly if an electrostatic filter is installed upstream. Operational experience has shown that the main fraction of condensed tar and oil residuals are precipitated out in the electrostatic filter, the efficiency of electrostatic filters for the removal of such substances normally being about 95%.

The process according to the invention is such that the charged, contaminated, adsorbent is not fed back into the production cycle, but is burnt in a low temperature fluidized bed boiler. These boilers operate preferably at temperatures of about 800°–900° C. The energy produced is employed to produce heat and/or electricity. The ashes or slags from the low temperature fluidized bed boiler can be stored in any industrial dumping site without problem.

The adsorbent employed in the process according to the invention is of a particle size on the scale of filter dust viz., in which 95% of the particles are less than 100 $\mu$m in size. The lime content of the adsorbent is preferably between 1 and 8 wt%, in particular between 1 and 5 wt%, depending on the sulphur content. The lime can be employed as milk of lime, slaked or non-slaked. After combustion of the charged adsorbent one is left with calcium sulfate or calcium fluoride, both completely inconsequential residues.

In addition to lime or lime and gypsum one can also add brown coal dust or charcoal dust to the adsorbent.

If the dry scrubber unit has two reactors, the coal waste (ground electrode waste and carbon-rich dust from the transportation operations) can be fed to the first and the lime, if desired mixed with additives, fed to a second reactor.

In general the adsorbent according to the invention for dry scrubbing units used to purify waste gas fumes from plates manufacturing carbon electrodes is such that it comprises fine-grained, ground electrode residue, carbon-rich dusts from transportation operations and lime or lime and gypsum. The lime fraction is preferably 1 to 8 wt%, in particular 1–5 wt%. Furthermore, the adsorbent can additionally contain brown coal dust or charcoal dust. In the very fine grained adsorbent 95% of the particles are preferably less than 100 μm in size.

The reactor/reactors of the dry scrubbing unit is/are well insulated. The necessary operating temperature is maintained by the waste gas stream fed to it; no additional heating is required.

The insulation prevents conditions falling below the dew point and prevents expensive corrosion damage occurring.

Three significant advantages are achieved by way of the invention:

(a) The solid waste products are utilized in an ecologically sound manner.

(b) The emissions released in the form of fumes from the baking furnaces and electrode mass treatment plants are significantly reduced.

(c) The calorific value of the waste products is utilized to generate heat and/or electricity.

What is claimed is:

1. Process for concentrating solid, liquid and gaseous waste products which arise during the manufacture of carbon electrodes which comprises: providing solid waste products from the manufacture of carbon electrodes, mixing the said solid electrode waste with carbon-rich dusts from the crushing operations and lime to form a mixture converting said mixture to fine particulate sizes by grinding and screening wherein 95% of the particles thereof are equal to or less than 100 μm in size, feeding the resultant product as adsorbent through a dry scrubbing unit, passing gaseous waste products containing liquid fractions through the adsorbent of the dry scrubbing unit to form a charged adsorbent, and combusting the charged adsorbent together with oily waste in a low temperature fluidized bed boiler.

2. Proces according to claim 1 including the step of mixing the said solid electrode waste with carbon-rich dusts from the crushing operations and a lime and gypsum combination to form said mixture.

3. Process according to claim 1 wherein the combusting step forms an ash or slag which is transported to a dumping site.

4. Process according to claim 1 in which an electrostatic filter is provided upstream of the dry scrubbing unit.

5. Process according to claim 1 in which the energy generated in the low temperature fluidized bed boiler is employed to produce heat and/or electricity.

6. Process according to claim 1 wherein the low temperature fluidized bed boiler operates at 800° to 900° C.

7. Process according to claim 1 wherein an adsorbent with a lime content of 1–8 wt.% is employed.

8. Process according to claim 7 wherein an adsorbent with a lime content of 1–5 wt.% is employed.

* * * * *